US007933384B2

(12) United States Patent
Cline et al.

(10) Patent No.: US 7,933,384 B2

(45) Date of Patent: Apr. 26, 2011

(54) EVALUATING PERFORMANCE OF A VOICE MAIL SYSTEM IN AN INTER-MESSAGING NETWORK

(75) Inventors: John E. Cline, Lawrenceville, GA (US); Roger K. Ruppert, Kennesaw, GA (US); Joseph H. Myers, Jr., Pelham, AL (US)

(73) Assignee: AT&T Intellectual Property I, L.P., Reno, NV (US)

( * ) Notice: Subject to any disclaimer, the term of this patent is extended or adjusted under 35 U.S.C. 154(b) by 914 days.

(21) Appl. No.: 11/844,747

(22) Filed: Aug. 24, 2007

(65) Prior Publication Data

US 2007/0291912 A1 Dec. 20, 2007

Related U.S. Application Data

(63) Continuation of application No. 10/611,205, filed on Jun. 30, 2003, now Pat. No. 7,263,173.

(51) Int. Cl.
*G06F 15/16* (2006.01)

(52) U.S. Cl. ................. 379/1.02; 379/10.01; 379/10.03; 379/27.04

(58) Field of Classification Search ................. 379/1.01, 379/1.02, 9, 9.06, 14, 10.01, 10.03, 15.03, 379/27.04, 29.02, 67.1, 88.18, 88.22
See application file for complete search history.

(56) References Cited

U.S. PATENT DOCUMENTS 5,329,579 A * 7/1994 Brunson ................... 379/88.26
5,572,570 A 11/1996 Kuenzig
5,835,565 A 11/1998 Smith et al.
5,933,475 A 8/1999 Coleman
6,091,802 A 7/2000 Smith et al.
6,292,909 B1 9/2001 Hare
6,405,149 B1 6/2002 Tsai et al.
6,477,492 B1 11/2002 Connor
6,504,905 B1 1/2003 Tsai et al.
6,516,051 B2 2/2003 Sanders
6,850,928 B1 2/2005 McClure et al.
7,263,173 B2 8/2007 Cline
7,263,176 B2 8/2007 Cline
7,379,535 B2 5/2008 Cline
2002/0077819 A1 6/2002 Girardo
2004/0190494 A1 9/2004 Bauer
2008/0219417 A1 9/2008 Cline

OTHER PUBLICATIONS

U.S. Patent Application entitled "Evaluating Performance of a Voice Mail Sub-System in an Inter-Messaging Network," filed Jun. 30, 2003, U.S. Appl. No. 10/611,205.

(Continued)

*Primary Examiner* — Binh K Tieu
(74) *Attorney, Agent, or Firm* — Thomas, Kayden, Horstemeyer & Risley, LLP

(57) ABSTRACT

One preferred embodiment of the present invention provides a system and method for evaluating the performance of an inter-messaging network of voice mail systems. This preferred embodiment includes an evaluation test unit that connects to the inter-messaging network and requests a test data file to be retrieved from a particular voice mail system in the inter-messaging network. The requests for the test data file are generated according to a schedule of operation so that the requests are repeated within a defined time span. Accordingly, the performance of the inter-messaging network, as represented by the result of the request attempt, is evaluated according to a defined level of performance, such as a preferred time limit. Other systems and methods are also provided.

17 Claims, 10 Drawing Sheets

OTHER PUBLICATIONS

Tieu, Binh Kien, Non-Final Office Action mailed Oct. 6, 2006, U.S. Appl. No. 10/611,205, filed Jun. 30, 2003.
Tieu, Binh Kien, Non-Final Office Action mailed Mar. 6, 2007, U.S. Appl. No. 10/611,205, filed Jun. 30, 2003.
Tieu, Binh Kien, Notice of Allowance mailed Jun. 14, 2007, U.S. Appl. No. 10/611,205, filed Jun. 30, 2003.
U.S. Patent Application entitled "Evaluating Performance of a Voice Mail Sub-System in an Inter-Messaging Network," filed Jun. 30, 2003, U.S. Appl. No. 10/610,773.
Gauthier, Gerald, Non-Final Office Action mailed Sep. 7, 2005, U.S. Appl. No. 10/610,773, filed Jun. 30, 2003.
Gauthier, Gerald, Final Office Action mailed Feb. 27, 2006, U.S. Appl. No. 10/610,773, filed Jun. 30, 2003.
Gauthier, Gerald, Non-Final Office Action mailed Aug. 1, 2006, U.S. Appl. No. 10/610,773, filed Jun. 30, 2003.
Gauthier, Gerald, Non-Final Office Action mailed Jun. 15, 2007, U.S. Appl. No. 10/610,773, filed Jun. 30, 2003.
U.S. Patent Application entitled "Diagnostic Checking of an Inter-Messaging Network," filed Jun. 30, 2003, U.S. Appl. No. 10/611,206.
Gauthier, Gerald, Non-Final Office Action mailed Sep. 7, 2005, U.S. Appl. No. 10/611,206, filed Jun. 30, 2003.
Gauthier, Gerald, Final Office Action mailed Feb. 27, 2006, U.S. Appl. No. 10/611,206, filed Jun. 30, 2003.
Gauthier, Gerald, Non-Final Office Action mailed Aug. 2, 2006, U.S. Appl. No. 10/611,206, filed Jun. 30, 3003.
Gauthier, Gerald, Non-Final Office Action mailed Jan. 5, 2007, U.S. Appl. No. 10/611,206, filed Jun. 30, 3003.
Gauthier, Gerald, Notice of Allowance mailed Jun. 26, 2007, U.S. Appl. No. 10/611,206, filed Jun. 30, 3003.
Cline; U.S. Appl. No. 10/610,773, filed Jun. 30, 2003.
Cline; U.S. Appl. No. 10/611,205, filed Jun. 30, 2003.
Cline; U.S. Appl. No. 10/611,206, filed Jun. 30, 2003.
Cline; Non-Final Rejection mailed Sep. 7, 2005; U.S. Appl. No. 10/610,773, filed Jun. 30, 2003.
Cline; Final Rejection mailed Feb. 27, 2006; U.S. Appl. No. 10/610,773, filed Jun. 30, 2003.
Cline; Non-Final Rejection mailed Aug. 1, 2006; U.S. Appl. No. 10/610,773, filed Jun. 30, 2003.
Cline; Non-Final Rejection mailed Jun. 15, 2007; U.S. Appl. No. 10/610,773, filed Jun. 30, 2003.
Cline; Non-Final Rejection mailed Oct. 16, 2007; U.S. Appl. No. 10/610,773, filed Jun. 30, 2003.
Cline; Non-Final Rejection mailed Oct. 6, 2006; U.S. Appl. No. 10/611,205, filed Jun. 30, 2003.
Cline; Non-Final Rejection mailed Mar. 6, 2007; U.S. Appl. No. 10/611,205, filed Jun. 30, 2003.
Cline; Notice of Allowance and Fees Due mailed Jun. 14, 2007; U.S. Appl. No. 10/611,205, filed Jun. 30, 2003.
Cline; Non-Final Rejection mailed Sep. 7, 2005; U.S. Appl. No. 10/611,206, filed Jun. 30, 2003.
Cline; Final Rejection mailed Feb. 27, 2006; U.S. Appl. No. 10/611,206, filed Jun. 30, 2003.
Cline; Non-Final Rejection mailed Aug. 2, 2006; U.S. Appl. No. 10/611,206, filed Jun. 30, 2003.
Cline; Non-Final Rejection mailed Jan. 5, 2007; U.S. Appl. No. 10/611,206, filed Jun. 30, 2003.
Cline; Notice of Allowance and Fees Due mailed Jun. 26, 2007; U.S. Appl. No. 10/611,206, filed Jun. 30, 2003.
Cline; U.S. Appl. No. 12/125,244, filed May 22, 2008.
Cline; Notice of Allowance and Fees Due mailed Mar. 14, 2008 for U.S. Appl. No. 10/610,773, filed Jun. 30, 2003.

* cited by examiner

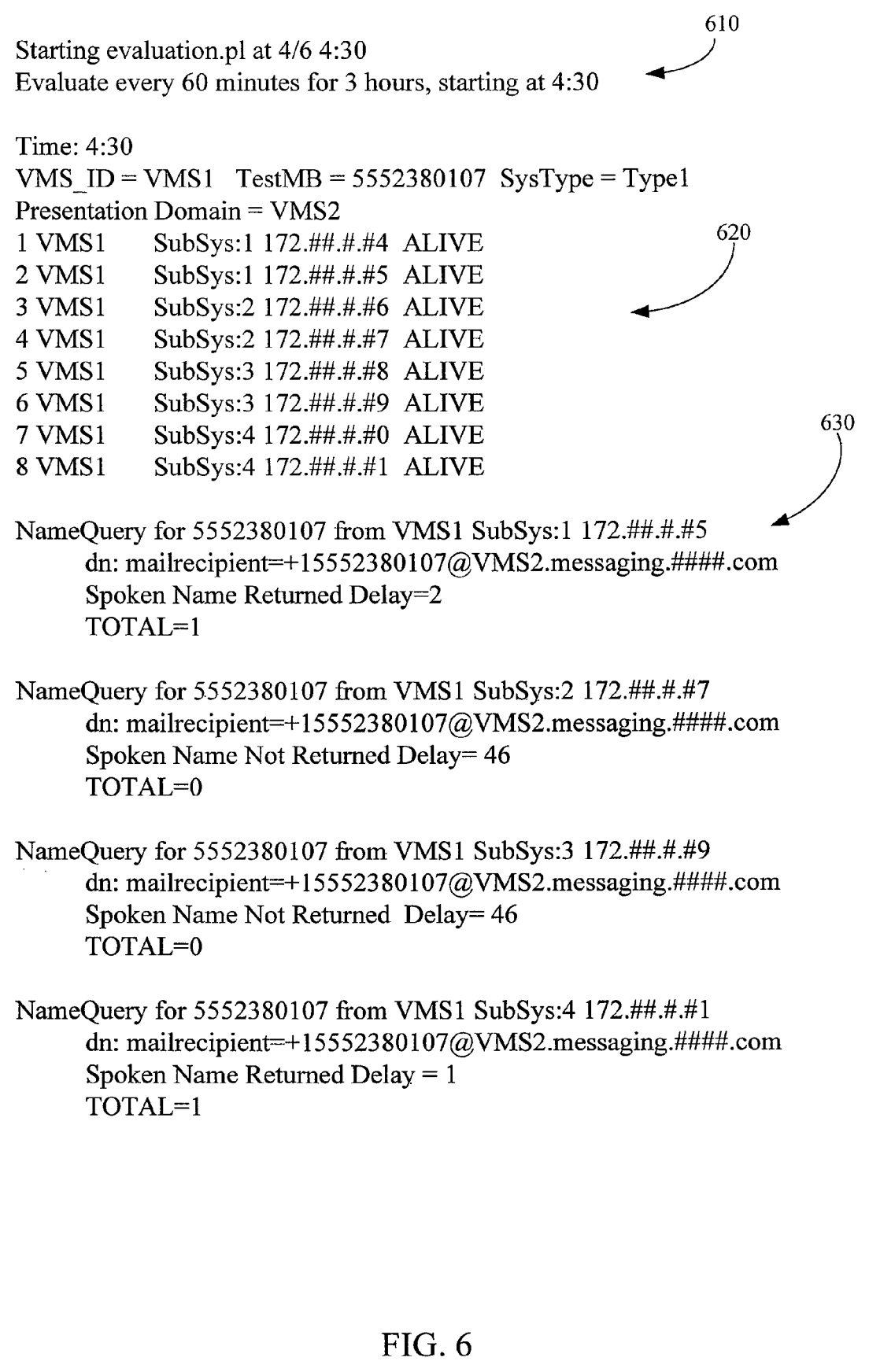

610

Starting evaluation.pl at 4/6 4:30
Evaluate every 60 minutes for 3 hours, starting at 4:30

Time: 4:30
VMS_ID = VMS1 TestMB = 5552380107 SysType = Type1
Presentation Domain = VMS2
1 VMS1 SubSys:1 172.##.#.#4 ALIVE
2 VMS1 SubSys:1 172.##.#.#5 ALIVE
3 VMS1 SubSys:2 172.##.#.#6 ALIVE
4 VMS1 SubSys:2 172.##.#.#7 ALIVE
5 VMS1 SubSys:3 172.##.#.#8 ALIVE
6 VMS1 SubSys:3 172.##.#.#9 ALIVE
7 VMS1 SubSys:4 172.##.#.#0 ALIVE
8 VMS1 SubSys:4 172.##.#.#1 ALIVE

620

630

NameQuery for 5552380107 from VMS1 SubSys:1 172.##.#.#5
dn: mailrecipient=+15552380107@VMS2.messaging.####.com
Spoken Name Returned Delay=2
TOTAL=1

NameQuery for 5552380107 from VMS1 SubSys:2 172.##.#.#7
dn: mailrecipient=+15552380107@VMS2.messaging.####.com
Spoken Name Not Returned Delay= 46
TOTAL=0

NameQuery for 5552380107 from VMS1 SubSys:3 172.##.#.#9
dn: mailrecipient=+15552380107@VMS2.messaging.####.com
Spoken Name Not Returned Delay= 46
TOTAL=0

NameQuery for 5552380107 from VMS1 SubSys:4 172.##.#.#1
dn: mailrecipient=+15552380107@VMS2.messaging.####.com
Spoken Name Returned Delay = 1
TOTAL=1

FIG. 6

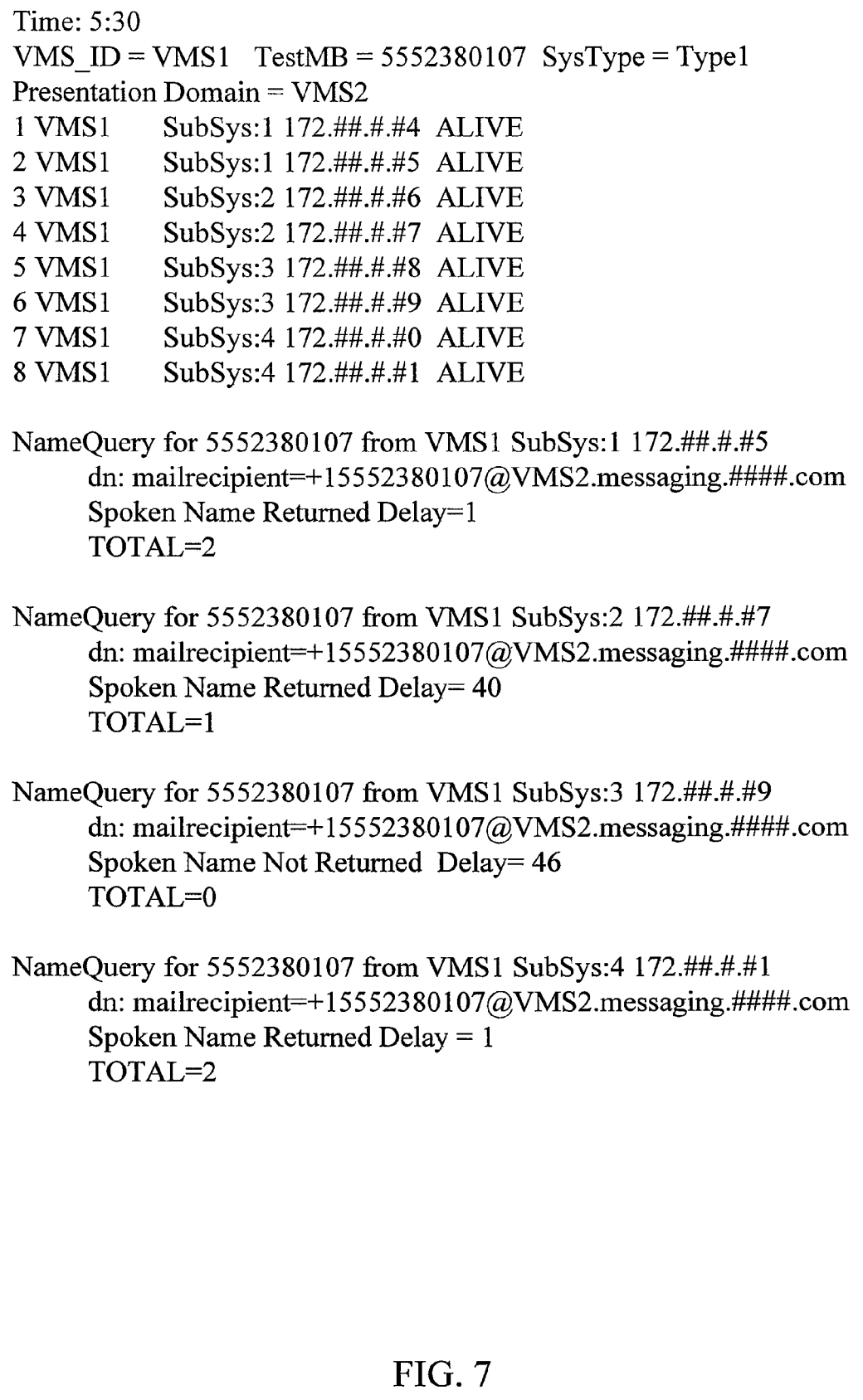

Time: 5:30
VMS_ID = VMS1 TestMB = 5552380107 SysType = Type1
Presentation Domain = VMS2
1 VMS1 SubSys:1 172.##.#.#4 ALIVE
2 VMS1 SubSys:1 172.##.#.#5 ALIVE
3 VMS1 SubSys:2 172.##.#.#6 ALIVE
4 VMS1 SubSys:2 172.##.#.#7 ALIVE
5 VMS1 SubSys:3 172.##.#.#8 ALIVE
6 VMS1 SubSys:3 172.##.#.#9 ALIVE
7 VMS1 SubSys:4 172.##.#.#0 ALIVE
8 VMS1 SubSys:4 172.##.#.#1 ALIVE NameQuery for 5552380107 from VMS1 SubSys:1 172.##.#.#5
dn: mailrecipient=+15552380107@VMS2.messaging.####.com
Spoken Name Returned Delay=1
TOTAL=2

NameQuery for 5552380107 from VMS1 SubSys:2 172.##.#.#7
dn: mailrecipient=+15552380107@VMS2.messaging.####.com
Spoken Name Returned Delay= 40
TOTAL=1

NameQuery for 5552380107 from VMS1 SubSys:3 172.##.#.#9
dn: mailrecipient=+15552380107@VMS2.messaging.####.com
Spoken Name Not Returned Delay= 46
TOTAL=0

NameQuery for 5552380107 from VMS1 SubSys:4 172.##.#.#1
dn: mailrecipient=+15552380107@VMS2.messaging.####.com
Spoken Name Returned Delay = 1
TOTAL=2

FIG. 7

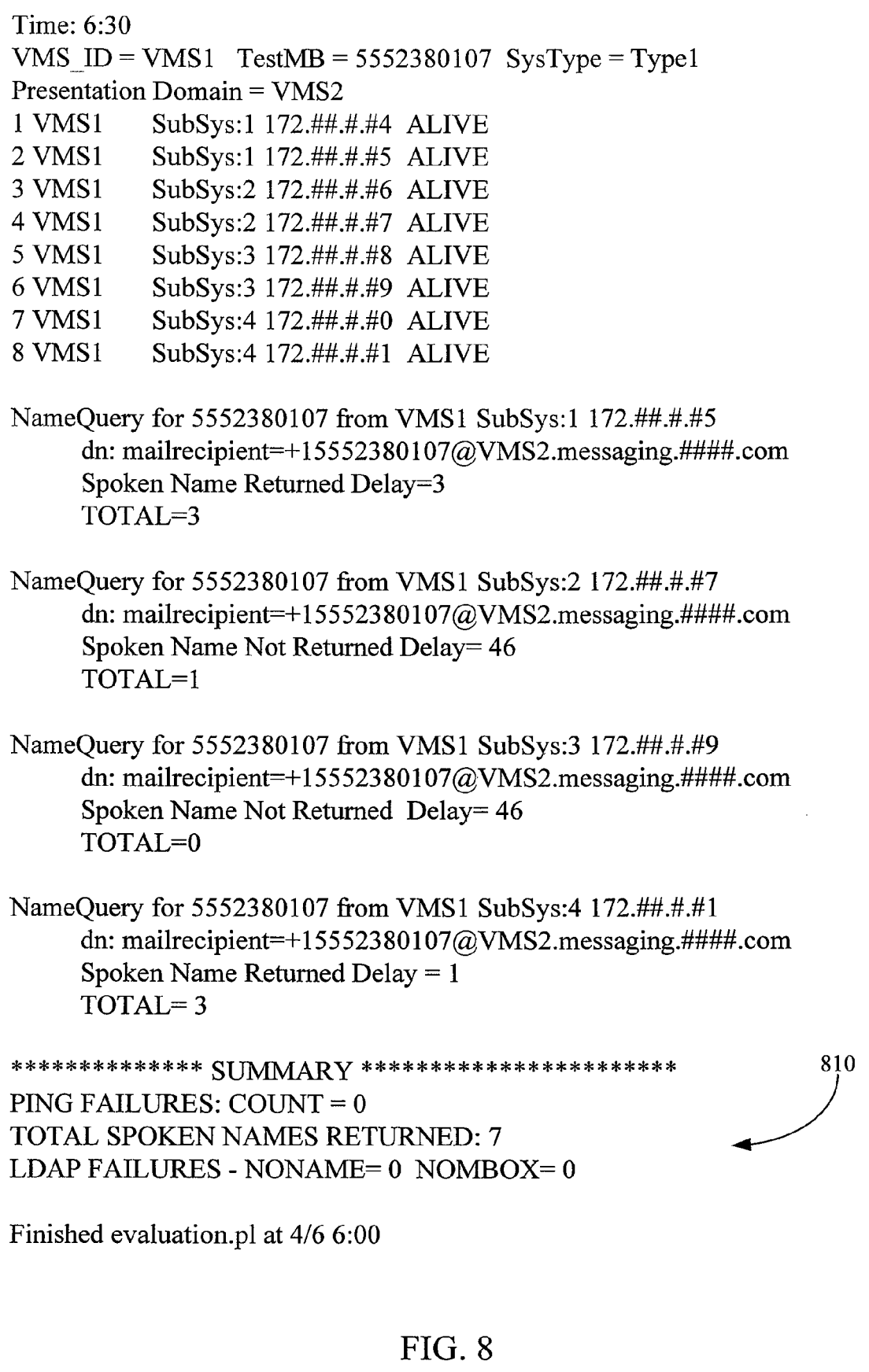

Time: 6:30
VMS_ID = VMS1 TestMB = 5552380107 SysType = Type1
Presentation Domain = VMS2
1 VMS1 SubSys:1 172.##.#.#4 ALIVE
2 VMS1 SubSys:1 172.##.#.#5 ALIVE
3 VMS1 SubSys:2 172.##.#.#6 ALIVE
4 VMS1 SubSys:2 172.##.#.#7 ALIVE
5 VMS1 SubSys:3 172.##.#.#8 ALIVE
6 VMS1 SubSys:3 172.##.#.#9 ALIVE
7 VMS1 SubSys:4 172.##.#.#0 ALIVE
8 VMS1 SubSys:4 172.##.#.#1 ALIVE NameQuery for 5552380107 from VMS1 SubSys:1 172.##.#.#5
dn: mailrecipient=+15552380107@VMS2.messaging.####.com
Spoken Name Returned Delay=3
TOTAL=3

NameQuery for 5552380107 from VMS1 SubSys:2 172.##.#.#7
dn: mailrecipient=+15552380107@VMS2.messaging.####.com
Spoken Name Not Returned Delay= 46
TOTAL=1

NameQuery for 5552380107 from VMS1 SubSys:3 172.##.#.#9
dn: mailrecipient=+15552380107@VMS2.messaging.####.com
Spoken Name Not Returned Delay= 46
TOTAL=0

NameQuery for 5552380107 from VMS1 SubSys:4 172.##.#.#1
dn: mailrecipient=+15552380107@VMS2.messaging.####.com
Spoken Name Returned Delay = 1
TOTAL= 3

************ SUMMARY ********************
PING FAILURES: COUNT = 0
TOTAL SPOKEN NAMES RETURNED: 7
LDAP FAILURES - NONAME= 0 NOMBOX= 0

810

Finished evaluation.pl at 4/6 6:00

FIG. 8

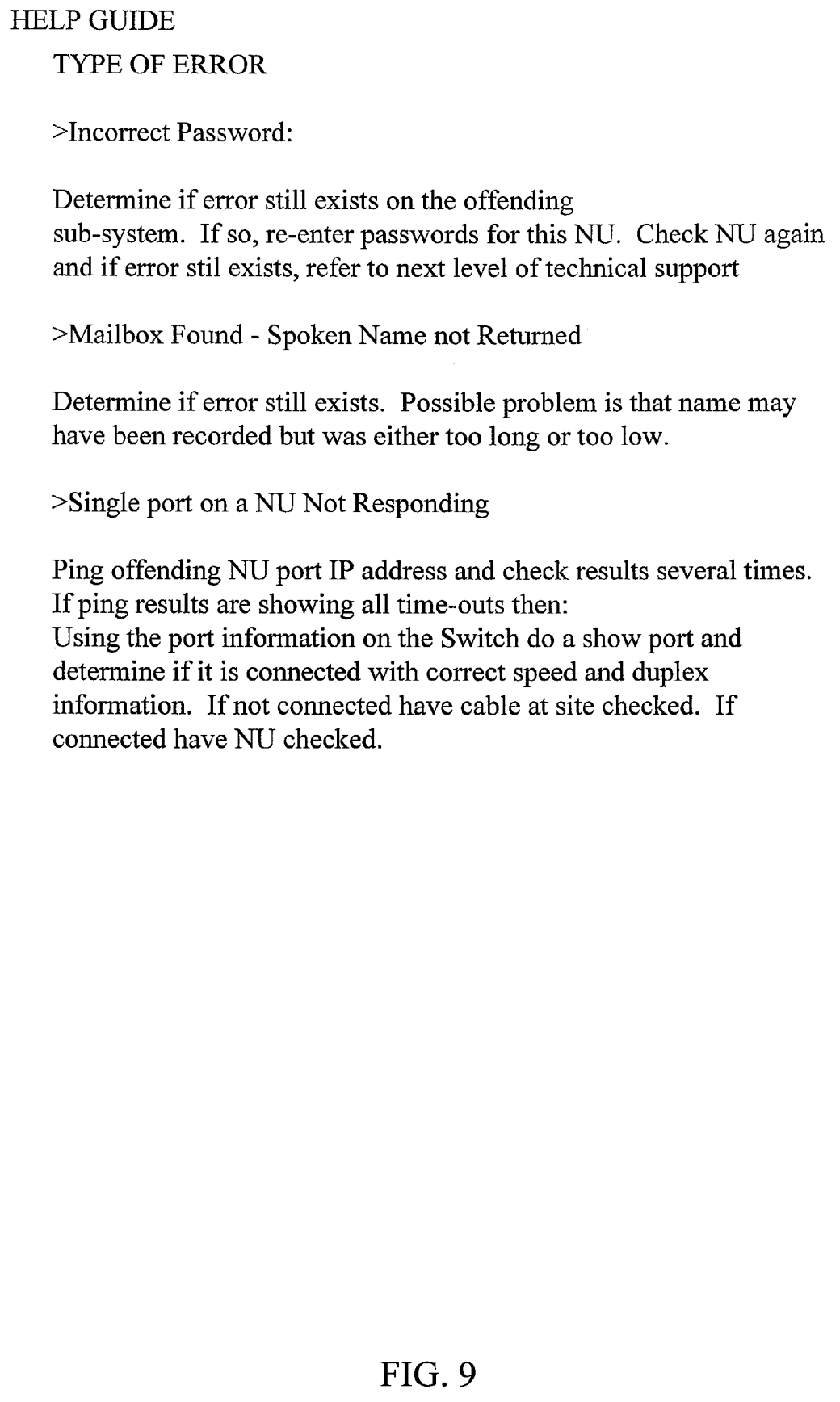

HELP GUIDE

TYPE OF ERROR

>Incorrect Password:

Determine if error still exists on the offending sub-system. If so, re-enter passwords for this NU. Check NU again and if error stil exists, refer to next level of technical support >Mailbox Found - Spoken Name not Returned Determine if error still exists. Possible problem is that name may have been recorded but was either too long or too low.

>Single port on a NU Not Responding

Ping offending NU port IP address and check results several times. If ping results are showing all time-outs then:
Using the port information on the Switch do a show port and determine if it is connected with correct speed and duplex information. If not connected have cable at site checked. If connected have NU checked.

FIG. 9

EVALUATING PERFORMANCE OF A VOICE MAIL SYSTEM IN AN INTER-MESSAGING NETWORK

CROSS-REFERENCE TO RELATED APPLICATIONS

This application is a continuation of copending U.S. utility application entitled, "Evaluating Performance of a Voice Mail System in an Inter-Messaging Network," having Ser. No. 10/611,205, filed Jun. 30, 2003, which is entirely incorporated herein by reference.

TECHNICAL FIELD

The present invention is generally related to messaging systems and, more particularly, is related to the evaluation of messaging systems.

BACKGROUND OF THE INVENTION

Messaging systems constitute a wide variety of technological systems that are provided by numerous different vendors. Accordingly, systems for linking different technological systems have been developed. For example, the voice mail industry adopted the Audio Messaging Interchange Specification (AMIS) standard for exchanging messages between different voice mail systems. AMIS addresses the problem of internetworking voice mail systems produced by different vendors.

There are two specifications for AMIS. One called AMIS-Analog uses dual tone multi-frequency (DTMF) tones to convey control information in analog transmissions of voice mail messages. Particularly, in the analog standard, AMIS defines a messaging standard where one voice mail system dials a second voice mail system and plays back DTMF codes from the message header that identifies the target mailbox. Then, the second voice mail system plays back the message to be delivered.

An AMIS-compatible message contains a standard header that includes address information such as the dial-in number of the addressee's voice mail system, the addressee's mailbox number, etc. By recording and storing the received message in the format native to the receiving system, the issue of incompatible message file formats is avoided.

The analog AMIS protocol is simpler and less capable than the second AMIS specification, AMIS-Digital. AMIS-Digital is based on completely digital interaction between two voice messaging systems. Control information and the voice message itself is conveyed between systems in digital form. By contrast, the AMIS-Analog specification calls for the use of DTMF tones to convey control information and transmission of the message itself is in analog form.

The AMIS-Digital specification is more robust than AMIS-Analog, providing a combination of features from the X.400 messaging recommendation and features commonly available in voice mail systems. For example, it supports features such as inclusion of a message originator's spoken name, and message addressing options such as delivery notification, confidential message, and future delivery.

Building upon the AMIS-Digital standard, Voice Profile for Internet Messaging (VPIM) is a proposed Internet messaging protocol to allow disparate voice mail systems to exchange voice mail over the Internet. VPIM builds on Simple Mail Transfer Protocol (SMTP) and Multi-purpose Internet Message Extensions (MIME) standards. These in turn are built upon the Transport Control Protocol/Internet Protocol (TCP/IP) infrastructures for Email interchange to allow standardized exchange of voice and fax messages among servers.

By supporting the AMIS and VPIM standards, for example, today's leading voice mail messaging providers are developing systems that can communicate and interact with systems from other providers. However, with a network involving different messaging technologies provided by different vendors, there is a problem in ensuring that the performance of the network is satisfactory. For example, even though an intended voice mail message may be delivered to its intended recipient, the transmission time to complete the delivery may not be satisfactory. Further, in addition to problems involved with networks of similar technology, diagnosing the source of network transmission problems in a network containing a wide variety of technologies is difficult without a good testing and error detection process. For instance, systematic manual testing of network components is very time consuming and limited.

Thus, a heretofore unaddressed need exists in the industry to address the aforementioned and other deficiencies and inadequacies.

SUMMARY OF THE INVENTION

One preferred embodiment of the present invention provides a system and method for evaluating the performance of an inter-messaging network of voice mail systems. This preferred embodiment includes an evaluation test unit that connects to the inter-messaging network and requests a test data file to be retrieved from a particular voice mail system in the inter-messaging network. The requests for the test data file are generated according to a schedule of operation so that the requests are repeated within a defined time span. Accordingly, the performance of the inter-messaging, as represented by the result of the request attempt, is preferably evaluated according to a defined level of performance, such as a preferred time limit.

Other systems, methods, features, and advantages of the present invention will be or become apparent to one with skill in the art upon examination of the following drawings and detailed description. It is intended that all such additional systems, methods, features, and advantages be included within this description and be within the scope of the present invention.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIG. 6 is a representation of a portion of the output generated by one embodiment of the evaluation test unit of FIG. 4.

FIG. 7 is a representation of a portion of the output generated by one embodiment of the evaluation test unit of FIG. 4

FIG. 8 is a representation of a portion of the output generated by one embodiment of the evaluation test unit of FIG. 4

FIG. 9 is a representation of a help guide display generated by one embodiment of the evaluation test unit of FIG. 4.

DETAILED DESCRIPTION OF THE PREFERRED EMBODIMENTS

Figure 1:
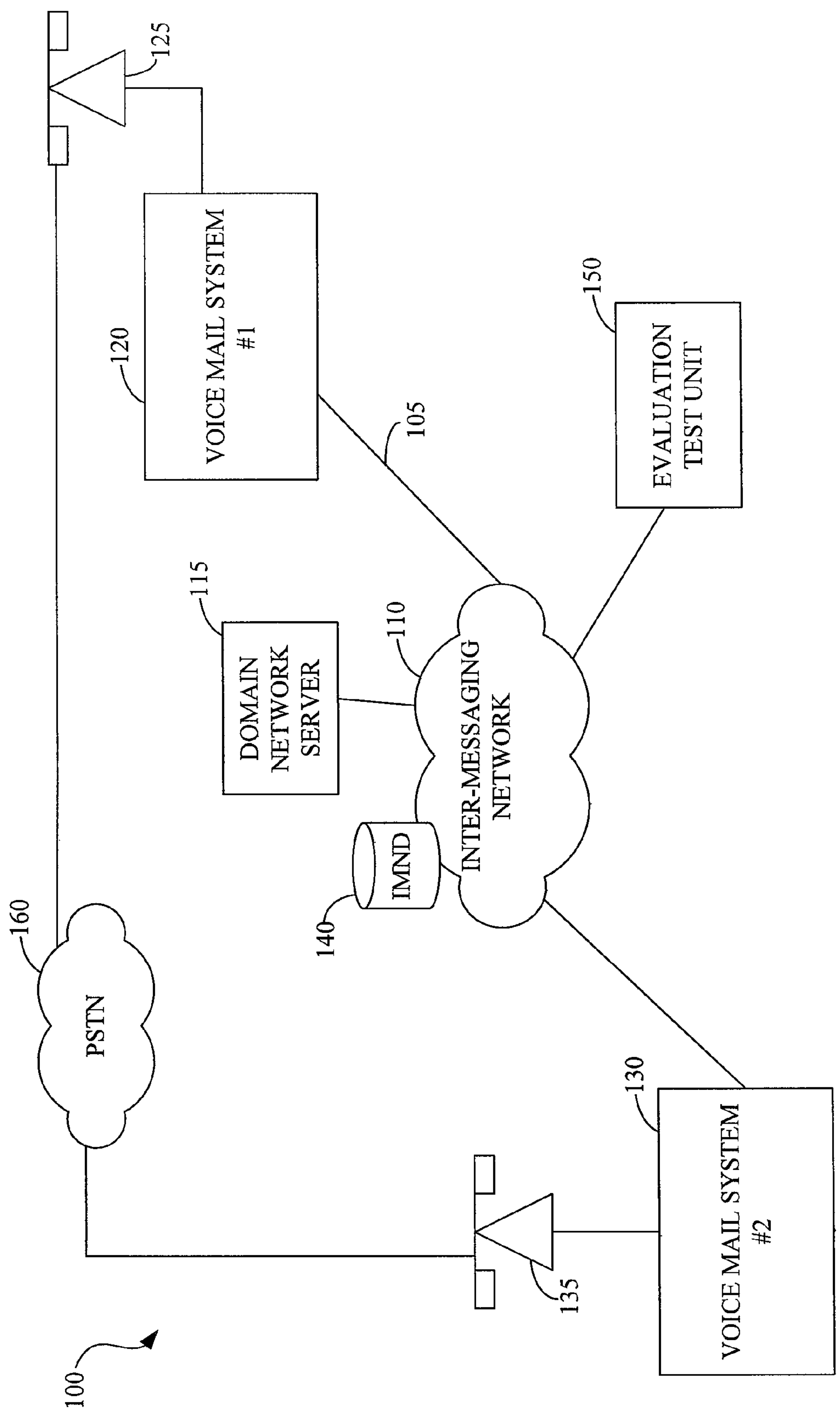
FIG. 1 is a block diagram of an embodiment of a messaging evaluation system 100 of the present invention.

FIG. 1 is a block diagram of an embodiment of a messaging evaluation system 100 of the present invention. The messaging evaluation system 100 includes an inter-messaging network 110. The inter-messaging network 110 is a communication network that enables communication between similar and different voice mail systems or platforms 120, 130. Accordingly, the inter-messaging network 110 ties various voice mail platforms so that they can send messages to each other over a TCP/IP network. The inter-messaging network 110 and voice mail systems 120, 130, for example, may follow an Audio Message Interchange Specification (AMIS) standard or Voice Profile for Internet Messaging (VPIM) standard to facilitate communications between various voice mail systems 120, 130.

Via the inter-messaging network 110, numerous voice mail systems 120, 130 may communicate to one another and forward and receive voice mail messages from one another. Voice mail systems 120, 130 may be from the same vendor and utilize the same technology or may be from different vendors and may utilize different technologies but follow the same messaging protocol(s), such as VPIM and/or AMIS.

An inter-messaging network database IMND 140 maintains information about message mailboxes of users that are hosted by the respective voice mail systems 120, 130. Further, telephone devices 125, 130 are respectively connected to voice mail systems 120, 130. Note, the respective connections from telephone device 135 to voice mail system 130 and telephone device 125 to voice mail system 120 are preferably through PSTN 160 (although not shown). IMND 140 typically contains, among other information, the telephone number of a user's voice mailbox and the identification of the voice mail system 120, 130 that the user's voice mailbox is on. A domain network server (DNS) 115 may be used to aid in the lookup of the Internet protocol (IP) address for the voice mail system 120, 130 based upon the identification information (e.g., a fully qualified domain name (FQDN)) for the voice mail system contained in IMND 140.

The voice mail systems 120, 130 feature the capability to store messages in a variety of audible, data formats required for providing a voice messaging service. These may include such information as spoken name, personal greeting and class of service. A lightweight directory access protocol (LDAP) server, or other online directory service, may be used to aid in the lookup of such information that is associated with a telephone number of a voice mail user. In this particular embodiment, the functionality of an LDAP server is performed by the IMND 140. Under the LDAP standard, an LDAP directory server contains data elements that form a directory tree for the inter-messaging network 110. An LDAP client (such as in a voice mail system 120, 130) connects to the LDAP directory server to obtain a set of information or to request the server to perform an operation. The directory server performs the operation or provides the requested information, if possible.

An evaluation test unit (ETU) 150 is also connected to the inter-messaging network 110 and communicates with voice mail systems 120, 130. The ETU 150 checks the operability of the inter-messaging network 110 as a whole by verifying that the voice mail systems 120, 130 and inter-messaging network 110 transfer voice mail messages successfully at a desired level of performance. The ETU 150 may be included within a voice mail system 120, 130 or may be separate therefrom, and preferably functions as an LDAP client. Also, more than one ETU 150 may be connected to the inter-messaging network 110.

Figure 2:
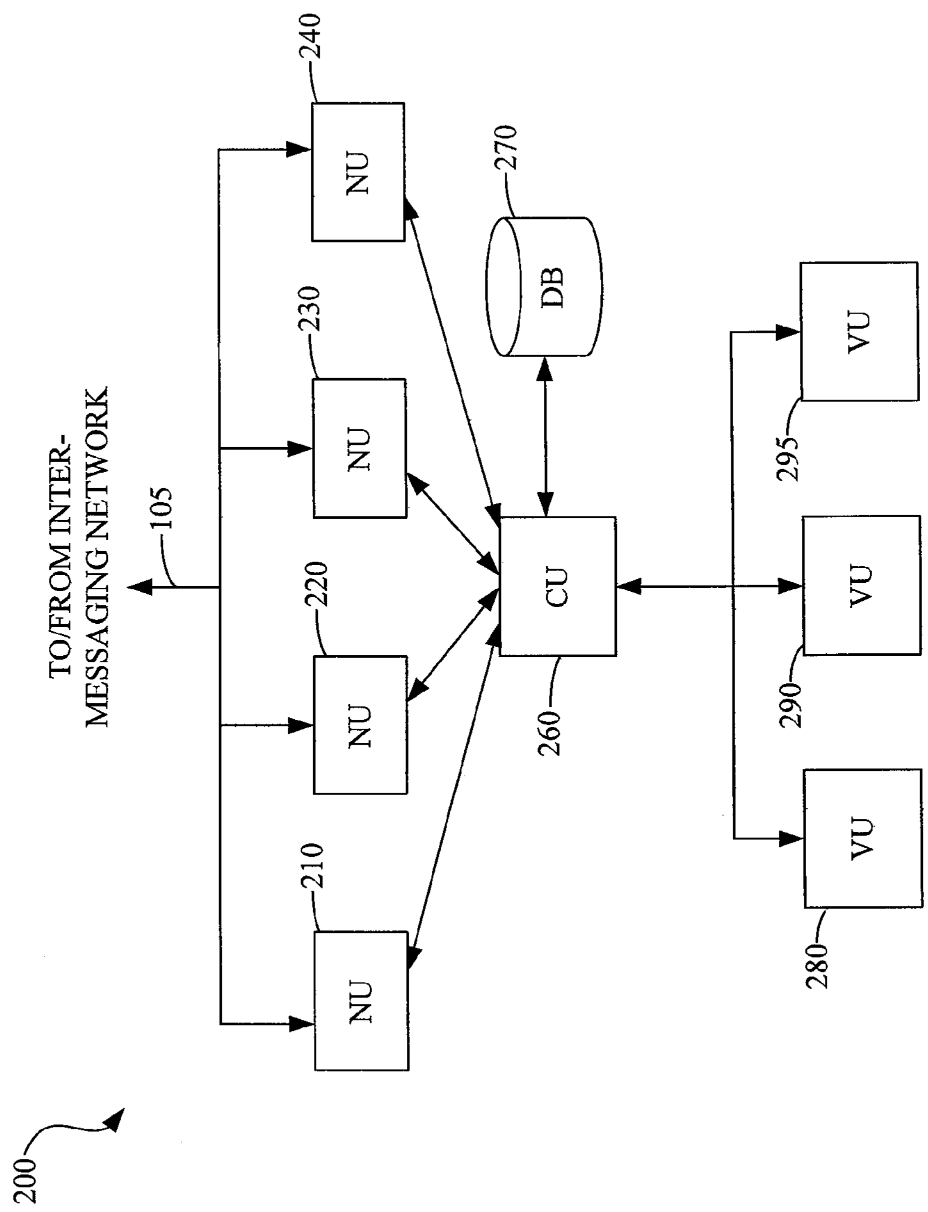
FIG. 2 is a block diagram of an embodiment of one type of voice mail system of FIG. 1.

FIG. 2 shows an embodiment of one type of voice mail system 120 that is representative of a system supplied by many vendors. This particular embodiment 200 of the voice mail system 120 includes network interface units (NU) 210-240. Each NU is active, commonly grouped in pairs, and communicates with the inter-messaging network 110. Correspondingly, each NU 210-240 communicates with a control unit (CU) 260. The CU 260 of the VMS 120 is a computer type device programmed to manage the operations of the system 120. The CU 260 communicates with a database unit (DB) 270. The DB 270 maintains information corresponding to identifying on which voice processing unit (VU) 280-295 a user's mailbox is located.

The respective VU handles playback, generation, and storage of the voice messages for the voice mail mailboxes that it services. Each of the VUs 280-295 is also a computer type device. The VUs 280-295 each include or connect to one or more digital mass storage type memory units (not shown) in which the voice messages are stored. The CU 260 also communicates with VUs 280-295.

The NU 210-240 is a computer type device that acts as an interface between the voice mail system 120, that typically operates on a Unix operating system, and the TCP/IP inter-messaging network 110. There are typically multiple NUs 210-240 per voice mail system 120. The number may vary depending on the number of users of a respective platform, for example. Communication 105 from the inter-messaging network 110 to a particular VMS 200 is distributed between the plurality of NUs 210-240. Each NU 210-240 communicates with the CU 260. Accordingly, the CU 260 manages requests from the various NUs to communicate with the various VUs.

For example, consider a request from a voice mail system #2 130 to retrieve a voice recording from a user's mailbox contained on voice mail system #1 120, 200, as represented in FIG. 2. The VMS #2 130 sends the request for the spoken name over the inter-messaging network 110 to the VMS #1 120, 200. The VMS 120, 200 receives the request and forwards it to one of the NUs 210-240 contained within the system 120, 200. One of the NUs 210-240 receives and processes the request. The processing includes querying the CU 260 for information about the mailbox (e.g., whether the mailbox exists on the platform, whether the mailbox has a recorded spoken name announcement, if so, which VU stores the spoken name announcement, the path/filename where it is stored, etc.). The CU 260 knows some of this information directly, but other items must be retrieved from the DB 270. After the NU gets a response from the CU 260, the NU gets the recorded spoken name announcement directly from the VU and returns it to the remote system that requested it. The communications between NU, CU, and DB are in platform proprietary formats, where LDAP is used between the NU, IMND, and the far end NU.

Figure 3:
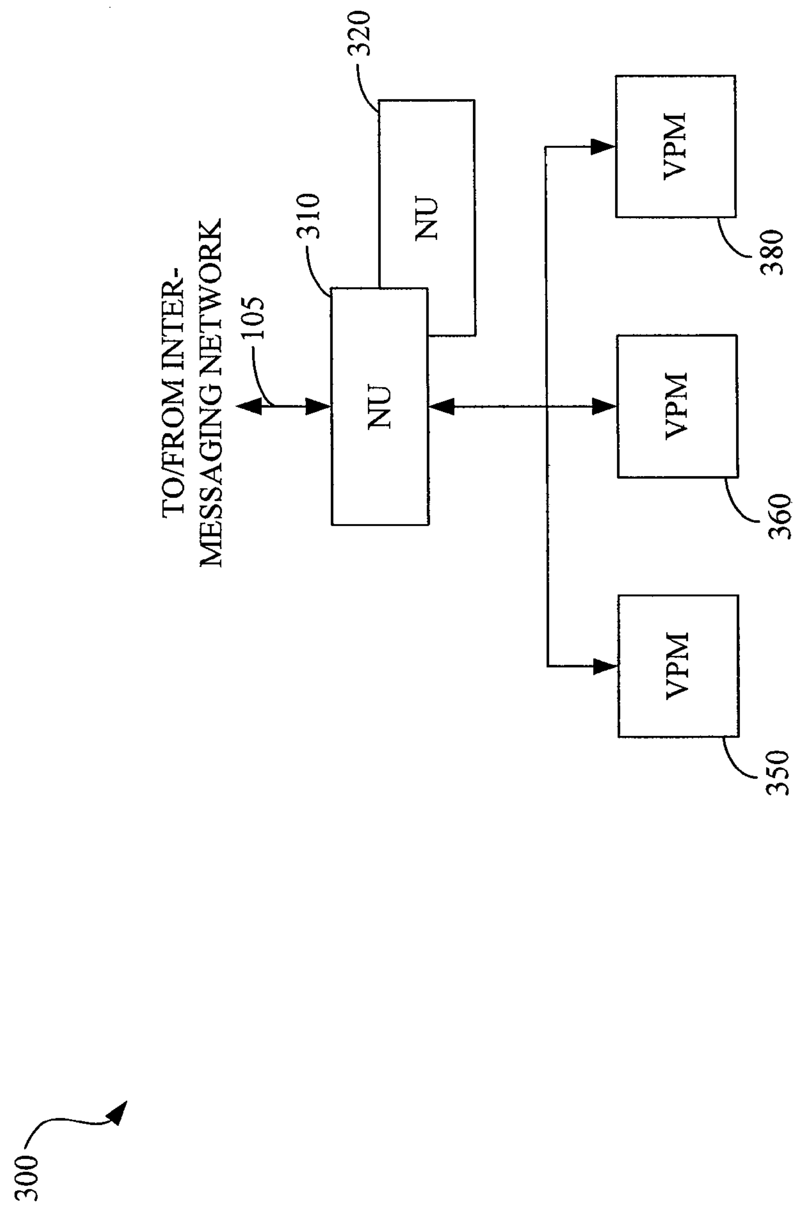
FIG. 3 is a block diagram of an embodiment of one type of voice mail system of FIG. 1.

FIG. 3 shows another representation of a voice mail system 130, 300 that varies from the VMS 120, 200 and may be utilized in the inter-messaging system 110, along with other voice mail systems. Here, the functionality of the CU devices and DB device is combined into a (computer-type) voice processing machine (VPM) 350-380. NU devices 310-320 act as servers for VPMs 350-380 and network 110. NU's 310-320 contain database pertaining to each associated VPM. One NU device is active and the additional NU is provided as a backup for the active NU in case it fails. Network routing information for the VMS 130, 300 is directed to a virtual address for the associated NU pair. Use of the virtual address allows only the active unit to respond to network communication.

Within VMS 300, the active NU communicates with various voice processing machines VPMs 350-380. Accordingly, each VPM 350-380 also contains a database maintaining information corresponding to identifying a user's mailbox 296-298. Communication from the inter-messaging network 110 is directed to a VPM 350-380 via the NU.

For example, consider a request from a voice mail system #1 120 to retrieve a voice recording from a user's mailbox contained on voice mail system #2 130, 300, as represented in FIG. 3. The VMS #1 120 sends the request over the inter-messaging network 110 to the active NU. The active NU receives the request and forwards it to the appropriate VPM 350-380 contained within the system 130, 300. The receiving VPM then retrieves the voice recording for the appropriate user's mailbox. Note, other VMS systems may feature different technological designs than shown in FIGS. 2-3 and are contemplated by the present invention.

Figure 4:
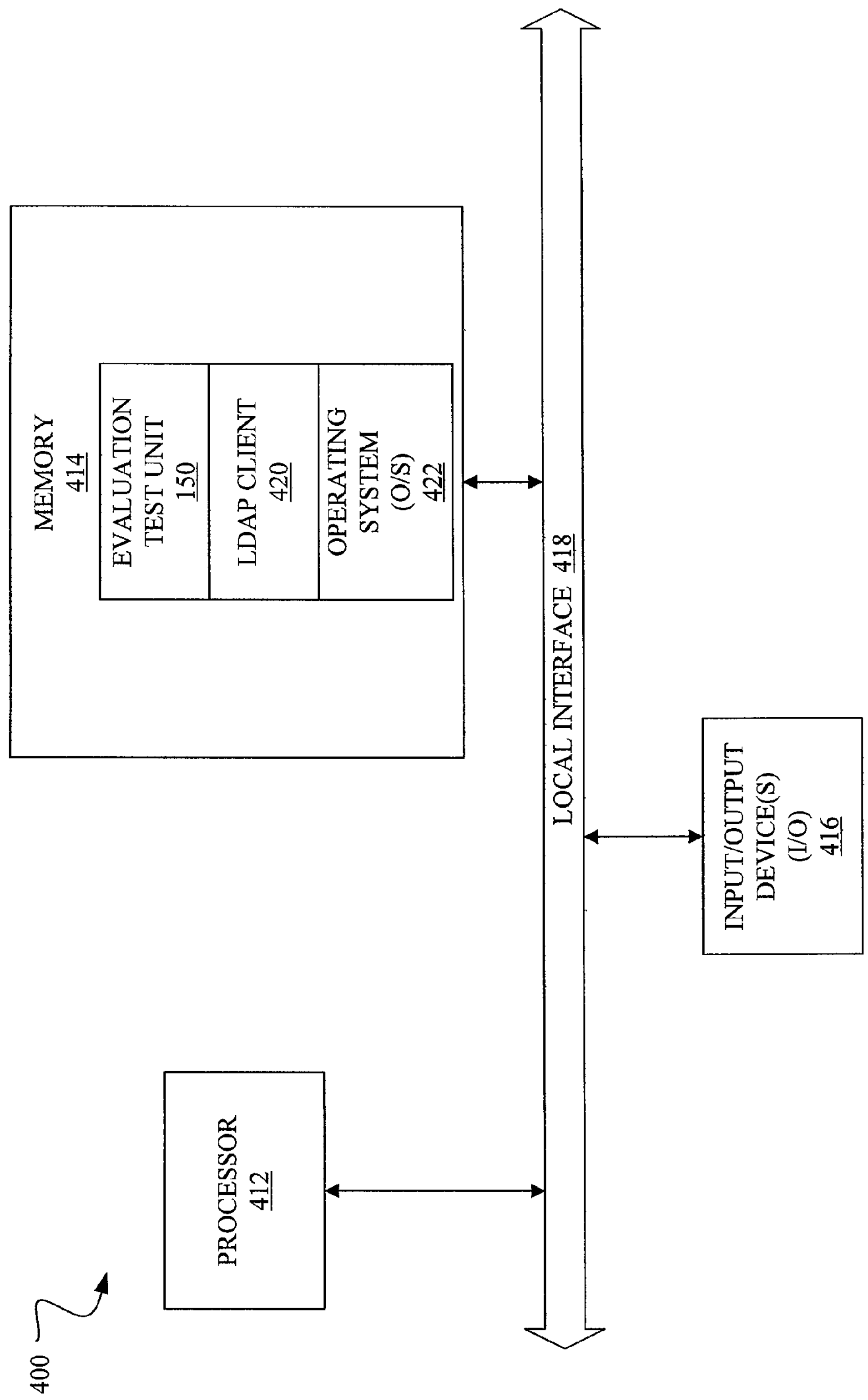
FIG. 4 is a block diagram of an embodiment of an evaluation test unit of FIG. 1.

FIG. 4 shows an embodiment 400 of the ETU 150 as employed in the messaging evaluation system 100. As stated previously, the ETU 150 does not have to (but may) share computing resources with the network interface subsystems, such as a NU 210-240, 310-320. The ETU 150 may be a stand-alone computing device that is capable of communicating on the inter-messaging network 110, via the LDAP protocol for example.

The ETU 150 of the invention can be implemented in software (e.g., firmware), hardware, or a combination thereof. In the currently contemplated best mode, the ETU 150 is implemented in software, as an executable program, and is executed by a special or general purpose digital computer, such as a personal computer (PC; IBM-compatible, Apple-compatible, or otherwise), workstation, minicomputer, or mainframe computer. An example of a general-purpose computer that can implement the ETU of the present invention is shown in FIG. 4. In FIG. 4, the ETU is denoted by reference numeral 150.

Generally, in terms of hardware architecture, as shown in FIG. 4, the computer 400 includes a processor 412, memory 414, and one or more input and/or output (I/O) devices 416 (or peripherals) that are communicatively coupled via a local interface 418. The local interface 418 can be, for example but not limited to, one or more buses or other wired or wireless connections, as is known in the art. The local interface 418 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 412 is a hardware device for executing software, particularly that stored in memory 414. The processor 412 can be any custom made or commercially available processor, a central processing unit (CPU), an auxiliary processor among several processors associated with the computer 400, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory 414 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 414 may incorporate electronic, magnetic, optical, and/or other types of storage media. Note that the memory 414 can have a distributed architecture, where various components are situated remote from one another, but can be accessed by the processor 412.

The software in memory 414 may include one or more separate programs, each of which comprises an ordered listing of executable instructions for implementing logical functions. In the example of FIG. 4, the software in the memory 414 includes the ETU 150 in accordance with the present invention, a LDAP client 420, and a suitable operating system (O/S) 422. A nonexhaustive list of examples of suitable commercially available operating systems 422 is as follows: (a) a Windows operating system available from Microsoft Corporation; (b) a Netware operating system available from Novell, Inc.; (c) a Macintosh operating system available from Apple Computer, Inc.; (e) a UNIX operating system, which is available for purchase from many vendors, such as the Hewlett-Packard Company, Sun Microsystems, Inc., and AT&T Corporation; (d) a LINUX operating system, which is freeware that is readily available on the Internet; (e) a run time Vxworks operating system from WindRiver Systems, Inc.; or (f) an appliance-based operating system, such as that implemented in handheld computers or personal data assistants (PDAs) (e.g., PalmOS available from Palm Computing, Inc., and Windows CE available from Microsoft Corporation). The operating system 422 essentially controls the execution of other computer programs, such as the ETU 150, and provides scheduling, input-output control, file and data management, memory management, and communication control and related services.

The ETU 150 may be a source program, executable program (object code), script, or any other entity comprising a set of instructions to be performed. When a source program, then the program needs to be translated via a compiler, assembler, interpreter, or the like, which may or may not be included within the memory 414, so as to operate properly in connection with the O/S 422. Furthermore, the ETU 150 can be written as (a) an object oriented programming language, which has classes of data and methods, or (b) a procedure programming language, which has routines, subroutines, and/or functions, for example but not limited to, C, C++, Pascal, Basic, Fortran, Cobol, Perl, Java, and Ada. In the currently contemplated best mode of practicing the invention, the ETU 150 is written as computer code using the Perl programming language.

The I/O devices 416 may include input devices, for example but not limited to, a keyboard, mouse, scanner, microphone, etc. Furthermore, the I/O devices 416 may also include output devices, for example but not limited to, a printer, display, etc. Finally, the I/O devices 416 may further include devices that communicate both inputs and outputs, for instance but not limited to, a modulator/demodulator (modem; for accessing another device, system, or network), a radio frequency (RF) or other transceiver, a telephonic interface, a bridge, a router, etc.

If the computer 400 is a PC, workstation, or the like, the software in the memory 414 may further include a basic input output system (BIOS) (omitted for simplicity). The BIOS is a set of essential software routines that initialize and test hardware at startup, start the O/S 422, and support the transfer of data among the hardware devices. The BIOS is stored in ROM so that the BIOS can be executed when the computer 400 is activated.

When the computer 400 is in operation, the processor 412 is configured to execute software stored within the memory 414, to communicate data to and from the memory 414, and to generally control operations of the computer 400 pursuant to the software. The evaluation test unit 150 and the O/S 422, in whole or in part, but typically the latter, are read by the processor 412, perhaps buffered within the processor 412, and then executed.

Figure 5:
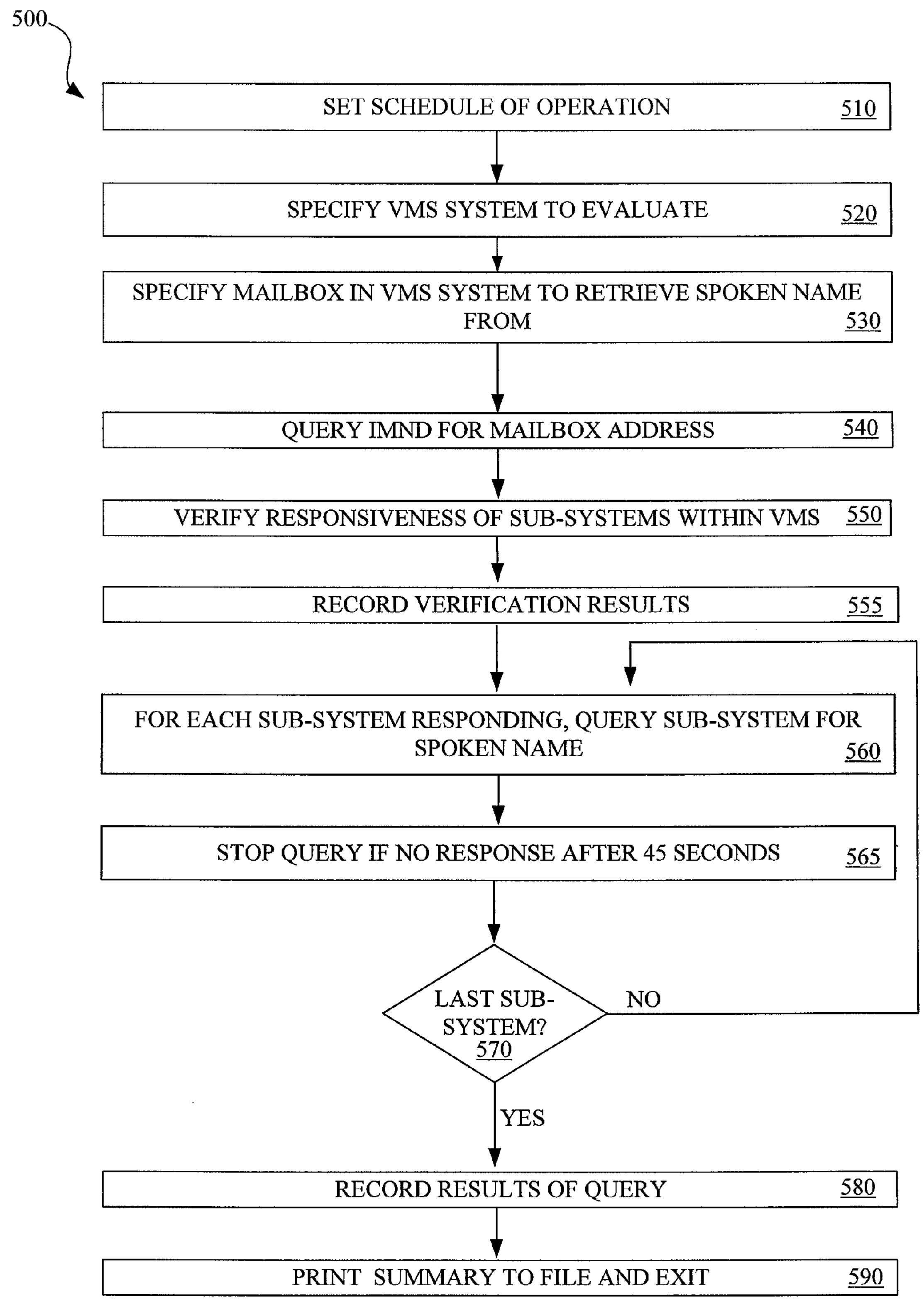
FIG. 5 is a flowchart illustrating the functionality 500 of one embodiment of the evaluation test unit of FIG. 4.

When the ETU 150 is implemented in software, as is shown in FIG. 5 hereafter, it should be noted that the evaluation test unit 150 can be stored on any computer readable medium for use by or in connection with any computer related system or method. For example, the ETU may be detailed in a computer program or script that runs on a voice mail system or a stand alone server. In operation of the script, the ETU 150 simulates a request to a remote voice messaging system for a specific subsystem and for a specific mailbox number. The operation of the ETU 150 may be launched and run in the background of a computer, since the necessary input information may be configured to be obtained from data files. For example, the platform to be tested and test mailbox may be determined by entries in a one-line data field.

In the context of this document, a computer readable medium is an electronic, magnetic, optical, or other physical device or means that can contain or store a computer program for use by or in connection with a computer related system or method. The ETU 150 can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where the ETU 150 is implemented in hardware, the ETU 150 can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Referring again to FIG. 1, the general operation of the inter-messaging system 110 will now be described. Consider the following common scenario: a first user logs into his voice mail system and decides to send a voice mail message to a second user of a different voice mail system. The first user enters the mailbox number of the second user, and then hears a recording (generated during setup of the second user's voice mail system) by the second user of the second user's voice saying the second user's name over the telephone PSTN network 160 or a wireless network (not shown). This announcement of a user's name is typically referred to as a "spoken name" and is stored and played back from the user's voice mail system 130.

The prompts the first user hears to generate a voice message or play back a voice message from another user are provided by the first user's local voice mail system 120. The only audio response provided by a remote voice mail system of another user is the user's spoken name. Typically, a local voice mail system 120 has a limited time frame in which it will wait to receive the spoken name from a remote voice mail system 130. If the spoken name is not received within that time frame (e.g., 3 to 5 seconds), the local voice mail system will typically announce the digits of the other party's phone number in lieu of the spoken name.

The first user may then leave a voice message by generating a voice recording on his or her local voice mail system 120. The local voice mail system 120 sends the recording via TCP/IP over the inter-messaging network 110 to the remote VMS 130. Then, the local voice mail system 120 announces a confirmation that the message was sent.

When the second user listens to the voice message, the voice mail system 130 of the second user may check or query the inter-messaging network database (IMND) 140 to see if the originator (first user) of the voice message is contained in the IMND 140. If the originator of the voice message is contained in the IMND 140, then at the end of the playback of the voice message, the second user's local voice mail system 130 provides the second user the option of generating a reply to the originator (first user). The reply, if made, will be sent to the Internet address of the remote voice mail system 120 registered with the originator (first user) in the IMND 140.

Alternatively, consider the scenario where the second user may check to see if there are any messages for the second user in the second user's mailbox (stored on a VU) on the local VMS. Therefore, the second user can log into his or her mailbox on a VU within his or her local VMS 130 and listens to any messages that have been left for the party. During the time that the second user is listening to the message, the second user's local VMS 130 checks to see if it can reply to the message by sending queries to the IMND 140 in the inter-messaging network 110. The queries check to see if the telephone number (of the first user) that sent the message being played is in the IMND 140. If so, the IMND 140 returns the Internet address of the remote VMS 120 that the sender (first user) resides on.

The local VMS 130, upon receiving the Internet address of the sender's voice mail system 120, requests the spoken name for the sender from the remote voice mail system 120 and receives it, preferably, within the stated time limit for that local system 120 which may be 3 to 5 seconds, for example. After the message has finished playing, the VMS 130 for the second user will then play the spoken name and prompts the second user to generate a reply by pressing a particular key on the second user's telephone 135, for example.

From these scenarios, it is shown that a retrieval of a spoken name is an integral component of modern voice mail communication. Accordingly, the ETU 150 of the messaging evaluation system 100 keys on the fact that the retrieval of the spoken name from another voice mail system 130 is an important indicator of how the inter-messaging network 110 is performing in its entirety. If a VMS 120 can request a spoken name for a particular user of a different VMS 130 and receive that spoken name in 3 to 5 seconds, then the inter-messaging network 110 can generally be assumed to be working satisfactorily, for example. However, if a spoken name is not received within an acceptable time, then there may be something wrong with the inter-messaging network 110.

By requesting and retrieving the spoken name, the functionality that is employed in sending a regular voice message can be tested in the inter-messaging network 110. For example, functions such as checking whether a user's mailbox or telephone number is in the IMND 140, and whether the Internet address of the calling party's VMS 130 is in the IMND 140 are checked. Further, the functionality of system components and connections are tested in and between two voice mail systems 120, 130 in communication, including routing and switching capabilities of the inter-messaging network 110. Accordingly, the retrieval of the spoken name is a valuable indicator of how the inter-messaging network 110 is working.

FIG. 5 depicts the functionality 500 of a preferred implementation of the ETU 150. It should be noted that, in some alternative implementations, the functions noted in the various blocks may occur out of the order depicted in this figure and subsequent figures. For example, two blocks in succession in a figure may, in fact, be executed substantially concurrently or the blocks may be executed in reverse order depending upon the functionality involved.

Referring now to the flowchart of FIG. 5, the present invention includes a method 500 for evaluating the operation of the inter-messaging network 110. The process 500 involves setting initialization variables, such as the schedule of operation of the process 500, as shown in block 510. For example, the process 500 may be scheduled to operate repeatedly over an 8 hour period starting at a set time, as indicated by block 510. The particular VMS 120, 130 that is to be evaluated is specified, as shown in block 520. If a particular VMS is not identified by a system operator or technician, then a default selection may be automatically chosen. For example, if the evaluation test unit 150 is located within a VMS 120, then the default selection may be that of the local VMS 120. Alternatively, a specific mailbox may be entered, and correspondingly, the VMS of that mailbox would be selected. Note, the user may provide input commands or responses via computer-type interfaces such as a keyboard or mouse.

In block 530, the mailbox (within a VU) that is to be tested for the particular VMS is determined. As previously stated, the mailbox may be specified by a system operator or technician. In lieu of no response, the mailbox may assumed to be a default mailbox setting for that particular VMS 120, 130. Next, the ETU 150 queries the IMND 140 for the Internet mailbox address, as shown in block 540. After the mailbox address is determined, each of the active network interface "sub-systems" (e.g., NU 210-140, 310-320) in the remote VMS 120, 130 that services the mailbox are verified to be responsive to network communications, as shown in block 550. Typically, this step is performed using a Packet Internet Grouper (PING) program or command to ensure that each of the network interface sub-systems is operating and is accessible on the inter-messaging network 110.

Since part of the function of the process 500 is to determine how many network interface sub-systems are featured in a voice mail system, the process may involve accessing a data file in a database (not shown) that contains this information for every voice mail system in the inter-messaging network. In some voice mail systems, each network interface sub-system is assigned more than one Internet address so that a particular sub-system may perform different services or operations (e.g., send and receive operations) simultaneously on several Internet addresses. For such a system, the ETU 150 may "ping" each Internet address that is assigned to a respective sub-system. As shown in block 555, the number of network interface sub-systems that respond to the PING may then be recorded or stored.

For each active sub-system (e.g., NU 210-140, 310-320) that is shown to be responsive to network communications, the ETU 150 queries the respective sub-system to retrieve the spoken name for the selected mailbox, as shown in blocks 560-570. Although a network interface sub-system may have more than one Internet address, if each Internet address responded successfully to the PING procedure, the query for the spoken name is sent to only one of the Internet addresses for the sub-system. If after a set amount of time, a query to a network interface sub-system for a spoken name has not resulted in a spoken name being returned, the query to the sub-system may be terminated, as shown in step 565. The amount of time that elapses before the spoken name is returned for a particular sub-system is recorded, as shown in step 580. Also, the result of not having a spoken name returned within the desired amount of time is recorded.

In preferred embodiments, the query is performed using a Lightweight Directory Access Protocol (LDAP) search utility ("ldapsearch") supported by the ETU 150 and the inter-messaging network 110. LDAP is a widely accepted, standard that allows client applications to access directory information over the inter-messaging network 110. LDAP is supported by most vendors of voice mail systems and is consistent with the X.500 directory model. Since many voice mail systems utilize LDAP protocol, the ETU 150 can run off of a voice mail system and check if the voice mail system is able to communicate successfully with other voice mail systems.

LDAP directory services can be provided within voice mail systems that are LDAP capable, for example, or on a standalone server 115. Under the LDAP directory structure, clients can access directory information, such as the spoken name, via a telephone number. Note, LDAP voice messages are made up of one or more parts, at least one of which must be voice message, and mostly of which are MIME encoded. The VPIM profile allows for optional, additional MIME parts for spoken name, forwarded messages and fax messages, and an electronic business card data definition, that allows automatic updating of directory information with a phone number, text name or Email address.

For example with LDAP, voice mail systems can read or update the IMND 140 which also recognizes the LDAP protocol. For instance, after creating a voice mail message by phone or forwarding a message to another recipient, the user can address the message by entering the recipient's phone number. Then, the local VMS 120 may make a LDAP query over the inter-messaging network 110 to the IMND 140 requesting for the identity (e.g., FQDN) of the voice mail system hosting the mailbox of the recipient. Then, the local VMS requests and receives an IP address listed in the DNS 115 for a network interface sub-system of that voice mail system identity. Accordingly, the local VMS sends a LDAP query to this network interface sub-system asking for specific attribute information, such as a spoken name, associated with the mailbox number of the recipient. The remote VMS 130 might then return the requested spoken name attribute from the remote VMS 130 to the local VMS 120. When the user on the local VMS 120 hears and confirms the spoken name, it validates that the mailbox address of the recipient is correct. The local VMS 120 may then send the message.

Therefore, by using an LDAP search utility, the ETU 150 can query the IMND 140 to obtain the identify of the VMS 120, 130 which hosts the recipient's voice mailbox. To do so, the ETU 150 provides the necessary information to complete the search such as a mailbox number, or telephone number, and the test data items that are being requested, such as a spoken name or, in alternative embodiments, a specific voice message. Then, the ETU 150 utilizes a LDAP client to initiate and complete the request under LDAP protocol. If the task is completed and the test data item or file is successfully retrieved. Then this can be indicated by the tags embedded in the LDAP message identifying the data file that is returned to the ETU 150.

As shown in block 590, after the network interface sub-systems have been evaluated in the targeted VMS, a summary of the results of the process is written to the output file. Results typically may include the time of the tests, the status of the network interface sub-systems from a PING procedure, the total number of request attempts that ended in failures, the total number of request attempts that were successful, etc. FIGS. 6-8 display portions of one embodiment of output results produced by one implementation of the evaluation test unit 150.

As shown in FIG. 6, for this particular example, the operation of the ETU 150 is indicated to have commenced at 4:30 on April 6. The ETU 150 is also shown to have been scheduled to evaluate a particular VMS named "VMS 1" every 60 minutes for 3 hours, as indicated by pointer 610. Accordingly, at 4:30 the first series of tests were performed at 4:30 for the specified test mailbox ("5552380107") as indicated by pointer 620. As shown, each IP address of the network interface sub-system or "SubSys" was pinged to verify that the device was "ALIVE" and responsive. Then, each network interface sub-system was queried to retrieve the spoken name from the test mailbox, as indicated by pointer 630. For example, the first sub-system or "SubSys:1" is shown to have returned the spoken name file in 2 seconds, as indicated by pointer 630. Accordingly, the "TOTAL" count of successful retrievals for this particular sub-system is shown to be 1.

FIGS. 7 and 8 are a continuation of the output results shown in FIG. 6 for the evaluation tests performed at 5:30 and 6:30. These results are displayed in the same manner as FIG. 6. In addition, in FIG. 8, at the end of the output results, a summary of the results is provided such as the number of PING failures, total spoken names returned, and LDAP failures for not finding the spoken name or mailbox, as indicated by pointer 810.

To aid a technician in diagnosing or troubleshooting the causes of network problems revealed in the output results, the evaluation test unit 150 may generate a help guide to list possible courses of action for the error messages generated. For example, in FIG. 9 a portion of a help guide is shown that may be generated along with the output results, as shown in FIGS. 6-8. With the help guide of FIG. 9, a technician is provided tips that the technician can consider in order to remedy or debug any network problems revealed by the ETU 150. As shown, the help guide may also be tailored to a specific voice mail systems, such as one that includes NU-type network interface sub-systems.

Consequently, the functionality 500 of the ETU 150 allows a technician to assess comprehensively and automatically a particular voice mail system 120, 130 by repeatedly testing the voice mail system and compiling the results to easily determine how many the times a component of the system failed within a stated time and how many times a component worked successfully and when. For example, the number of PING failures may tell an operator or technician if there is a network problem, faulty IP device, disconnected cord, etc.

In other words, a primary purpose of the messaging evaluation system 100 is to repeatedly query for LDAP spoken name from the sub-systems on a selected voice mail platform at specified intervals to determine long term query success rate and response time performance. When the query is to the local voice mail platform, the results should be independent of inter-messaging network issues except for impairments caused by the switch/router at the local site. When querying a remote voice mail platform, the performance results include impairments due to the inter-messaging network 110 between the sites. Accordingly, a technician can set up the interval and target a specific voice mail system that it is suspects may be experiencing problems to see if there is a time of day that experiences an exorbitant amount of problems as compared to other times.

Otherwise, testing of communication capabilities between different voice mail systems generally requires technicians to manually test the systems which is very time consuming and labor intensive. Further, manual testing is not necessarily a good indicator of how well a network is performing in its entirety. For example, the voice mail system of FIG. 2 features redundant NUs that may receive the spoken name request. Although there may be several NUs that are not functioning properly, the spoken name request may be directed to one of the properly working NUs that is able to fulfill the spoken name request. Accordingly, to a technician performing a manual test, that voice mail system would appear to be working properly although there are several components of the system that have in fact failed.

By way of illustration, if an operator tries to manually test a voice mail system on an inter-messaging network by calling a message mailbox and witnessing that a spoken name announcement is not heard over the telephone line in 3 to 5 seconds, the operator will not know if the spoken name was only slightly delayed or never received at all. However, with the messaging evaluation system 100 and method 500, a technician is better able to diagnose the problem with a voice mail system, since more is known about how the system is performing.

Figure 10:
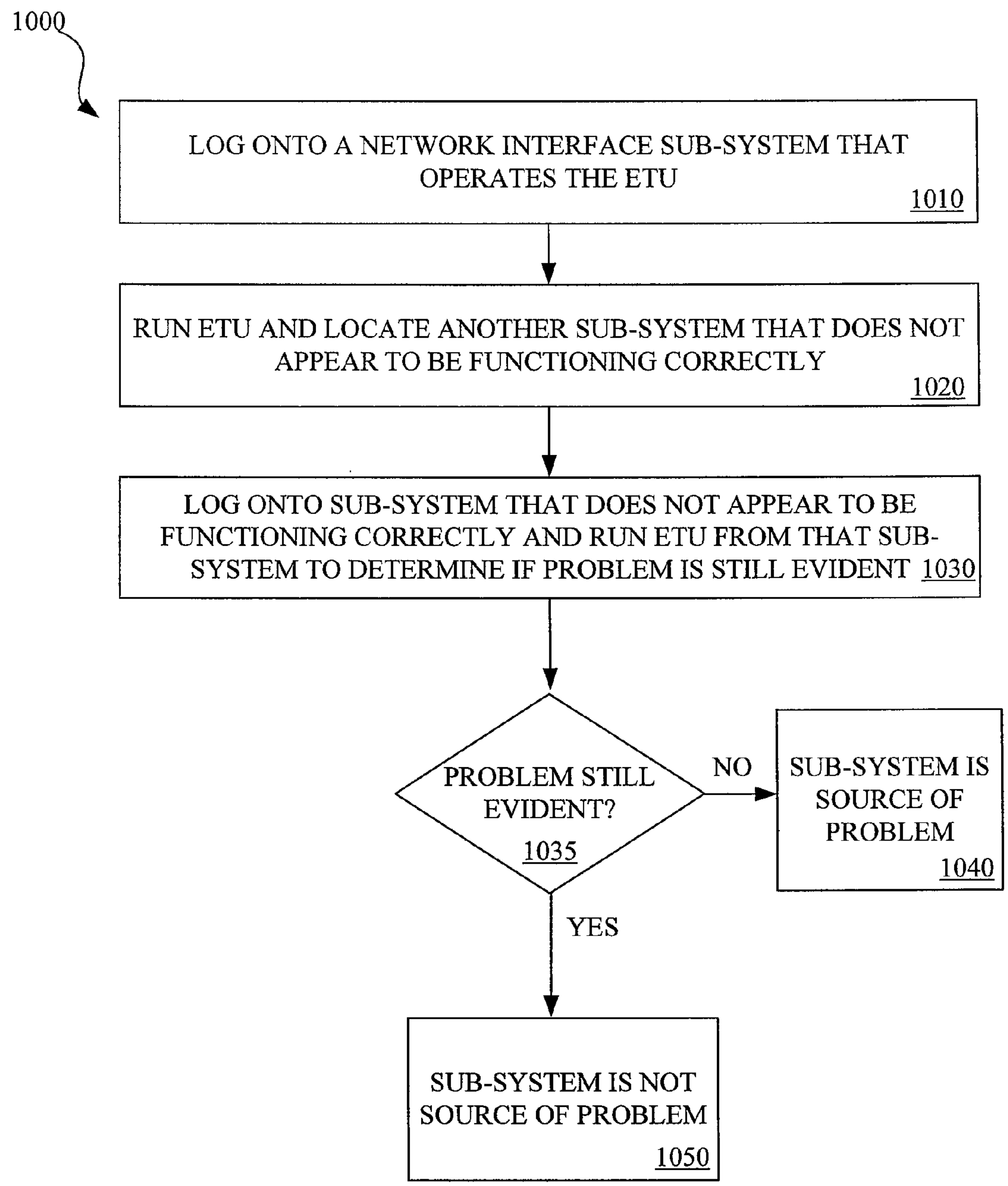
FIG. 10 is a flowchart describing an embodiment of a process for operating the evaluation test unit to locate a source of a technical problem in an inter-messaging network.

It should be emphasized that the above-described embodiments of the present invention, particularly, any "preferred" embodiments, are merely possible examples of implementations, merely set forth for a clear understanding of the principles of the invention. For example, it may be preferable that each sub-system in the inter-messaging system may include the evaluation test unit process, as shown in one embodiment of an evaluation process 1000 of FIG. 10. In this way, a technician can log onto any network interface sub-system that operates the ETU 150 to test the functionality of other sub-systems in the inter-messaging network, as shown in step 1010. Once the technician notices that the particular sub-system(s) in a particular voice mail system are producing failures, as depicted in step 1020, the technician can log on to those particular sub-system(s) and determine if the problem is still evident. If so, the problem may be diagnosed to involve that particular network interface sub-system, as shown in steps 1030-1040. If not, then the technician has diagnosed that the sub-systems are in fact not malfunctioning, as shown in steps 1035 and 1050. Rather, the problem is occurring somewhere in the inter-messaging network 110 between the two voice mail systems.

Accordingly, many variations and modifications may be made to the above-described embodiment(s) of the invention without departing substantially from the spirit and principles of the invention. For example, it is contemplated that the network diagnostic device may be employed for other messaging formats and technologies besides voice mail, such as e-mail and fax, for example. All such modifications and variations are intended to be included herein within the scope of this disclosure and the present invention and protected by the following claims.

Therefore, having thus described the invention, at least the following is claimed:

1. A system for evaluating the performance of an inter-messaging network, comprising:
a test unit device connected to the inter-messaging network, the test unit device configured to request a test data file on the inter-messaging network according to a schedule of operation defined by a user; and
a mailbox connected to the inter-messaging network, the mailbox containing the test data file,
wherein the test unit device verifies whether network interface subsystems within the inter-messaging network that services the mailbox are responsive to network communications and queries each responsive network interface subsystem to retrieve the test data file for the mailbox.

2. The system of claim 1, wherein the test data file is a spoken name for the mailbox.

3. The system of claim 1, wherein the test data file is a voice message for the mailbox.

4. The system of claim 1, further comprising:
a first voice mail system, the first voice mail system hosting the mailbox; and
a second voice mail system, the second voice mail system hosting the test unit device.

5. The system of claim 1, further comprising:
a directory server that receives a query from the test unit device to retrieve the test data file.

6. The system of claim 5, wherein the directory server supports Lightweight Directory Access Protocol.

7. The system of claim 1, further comprising:
a first voice mail system hosting the mailbox, wherein the test unit device does not reside in a voice mail system.

8. A system for evaluating the performance of an inter-messaging network, comprising:
a network interface for connecting to the inter-messaging network;
an output display for prompting a user to identify a particular voice mail system to evaluate on the inter-messaging network;
the output display for prompting the user to identify a schedule of operation for evaluating the particular voice mail system; and
a processor for requesting a test data file to be retrieved from the particular voice mail system in accordance with the schedule of operation; and for recording a result of the request attempt,
wherein the processor further verifies whether network interface subsystems within the inter-messaging network that services the mailbox are responsive to network communications and queries each responsive network interface subsystem to retrieve the test data file for the mailbox.

9. The system of claim 8, wherein the output display displays a result of the request attempt.

10. The system of claim 8, wherein the processor suggests a solution for a particular result if the particular result does not satisfy a defined performance standard.

11. The system of claim 10, wherein the defined performance standard is a time limit for retrieving the test data file.

12. The system of claim 8, wherein the processor verifies that the particular voice mail system is responsive to outside communication.

13. An apparatus for evaluating the performance of an inter-messaging network, comprising:
an interface adapted to connect to the inter-messaging network; and
logic configured to:
prompt a user to identify a particular voice mail system to evaluate on the inter-messaging network;
prompt the user to identify a schedule of operation for evaluating the particular voice mail system;
request a test data file to be retrieved from the particular voice mail system in accordance with the schedule of operation; and
record the result of a request attempt to retrieve the test data file,
wherein the logic is further configured to verify whether network interface subsystems within the particular voice mail system are responsive to network communications and query each responsive network interface subsystem to retrieve the test data file.

14. The apparatus of claim 13, the logic further configured to display the result of the request attempt.

15. The apparatus of claim 13, the logic further configured to display a guide to help troubleshoot a particular result if the particular result does not satisfy a defined performance standard.

16. The apparatus of claim 13, the logic further configured to verify whether the particular voice mail system is responsive to outside communication.

17. The apparatus of claim 13, the logic further configured to verify whether network interface sub-systems of the particular voice mail system are responsive to outside communication.

* * * * *